R. A. MACK.
COASTER SLED.
APPLICATION FILED OCT. 27, 1920.

1,418,818.

Patented June 6, 1922.
2 SHEETS—SHEET 1.

Witness:

Inventor:
Rudolph A. Mack,
By
Attorney.

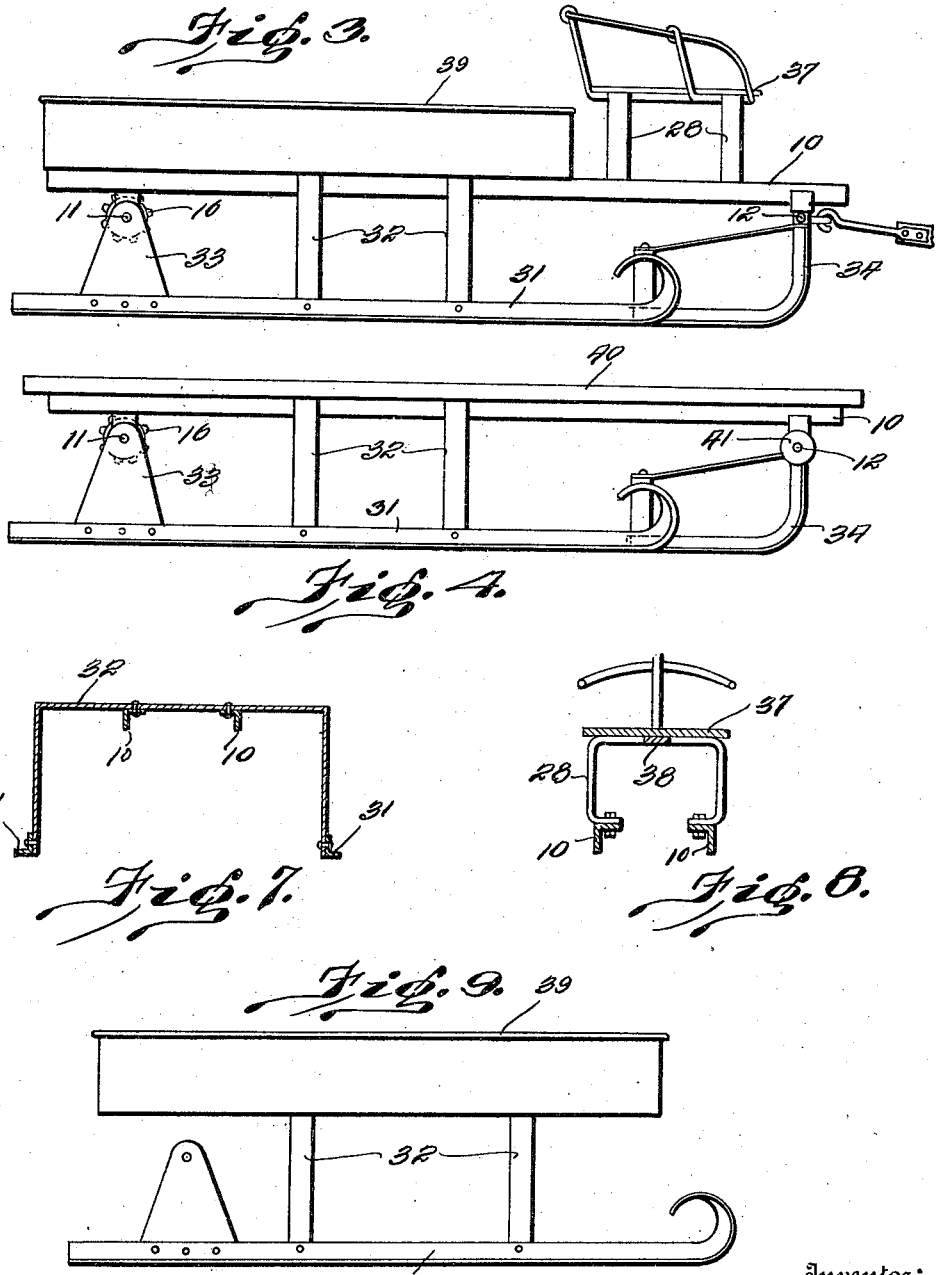

UNITED STATES PATENT OFFICE.

RUDOLPH A. MACK, OF GALLIPOLIS, OHIO.

COASTER SLED.

1,418,818.  Specification of Letters Patent.  Patented June 6, 1922.

Original application filed June 26, 1919, Serial No. 306,941. Divided and this application filed October 27, 1920. Serial No. 419,888.

*To all whom it may concern:*

Be it known that I, RUDOLPH A. MACK, a citizen of the United States, residing at Gallipolis, in the county of Gallia and State of Ohio, have invented new and useful Improvements in Coaster Sleds, of which the following is a specification.

This invention relates generally to combination vehicles and particularly to a novel construction of combination sled convertible into a variety of forms, the present application being a division of my prior application filed June 26, 1919, Serial No. 306,941.

The object of the invention is to provide a strong, durable and efficient type of vehicle, and one which may be readily converted by the user into any one of a variety of forms of which it is susceptible.

The invention consists of the features of construction, combination and arrangement of parts hereinafter fully described and claimed, reference being had to the accompanying drawings, in which:—

Figures 3 and 4 are side elevations of other forms of the invention.

Figure 7 is a detail section on line 7—7 of Figure 2.

Figure 8 is a transverse section through one of the seats of the vehicle and illustrating the manner in which the same is mounted on the vehicle chassis.

Figure 9 is a view of another form of the invention.

Figure 1:
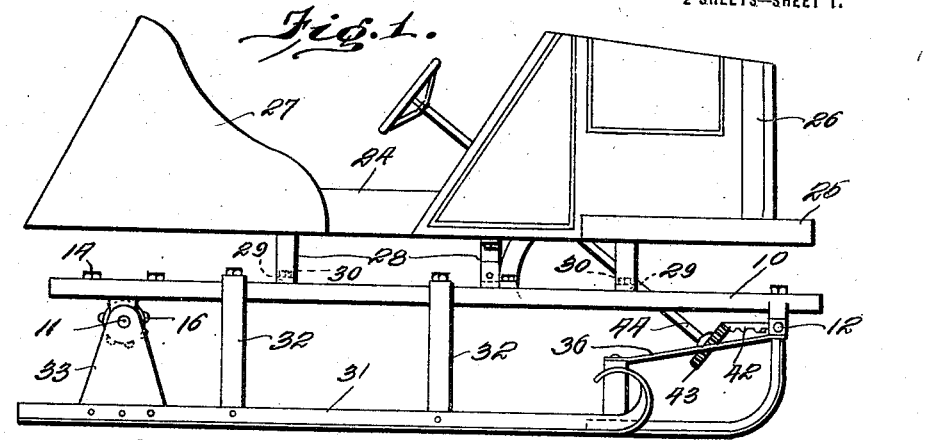
Figure 1 is a side elevation of a coaster sled constructed in accordance with my invention.

The invention consists essentially in a frame comprising a part of the chassis of the vehicle, to which a number of bodies or seats may be applied, and which is supported by sled runners. The bars constituting this frame are indicated at 10, and comprise angle bars as shown. These angle bars are straight throughout their lengths and are arranged in spaced parallel relation, being detachably connected together and rigidly held as a unit by the devices and elements to be hereafter detailed.

As disclosed in my aforesaid prior application Serial No. 306,941, my device is also adapted for use as a wheeled vehicle, and in its use either as a sled or as a wheeled vehicle I provide front and rear axles 11 and 12. The rear axle is disposed beneath the frame bars 10 and transversely of the latter and is journaled in bearing blocks 13. These blocks fit beneath the frame bars 10 and are bolted thereto as at 14. The blocks are connected at their rear ends by a tie plate 15, the latter being preferably formed integral with the bearing blocks, but it will be understood that the tie plate may be separate from the blocks and may be bolted or riveted to the latter as desired. The axle 11 is provided intermediate its ends with a gear or sprocket 16, disposed between the frame bars 10 for use as part of a drive gearing in the use of the device as a wheeled vehicle. The bearing blocks 13 and tie plate 15 thus, in addition to firmly supporting the axle 11, securely hold the bars 10 in proper spaced relation at their rear ends.

The front axle 12 has arranged intermediate its ends and upon its upper side a wear plate constituting a fifth wheel 17, which may be cast with or welded to the axle or may be bolted thereto as desired. The fifth wheel bears against a plate 18 affixed to the forward ends of the spaced bars 10, and this plate may be provided with the projections as shown to engage beneath the angle bars 10 and to be bolted thereto as at 20. The plate and its projections thus form a firm support for the fifth wheel of the steering axle and also rigidly maintain the forward ends of the frame bars 10 in proper spaced relation. A king bolt 21 passes through alined openings in the fifth wheel 17 and plate 18 to rotatably support the steering axle upon the said plate. The front axle is provided with eyes 22 to enable a draft tongue or shafts to be applied to the axle, and the axle is also provided upon its upper surface with foot plates 23 for the use of the occupant in resting his feet or in steering the vehicle.

In Figure 1 of the drawings I have shown the vehicle as simulating an automobile runabout sled, and as shown the body 24 includes the base portion 25, to the forward end of which is secured the imitation hood or engine cover 26, while the seat for the occupant of the vehicle is indicated at 27. The body is secured to the frame bars 10 by means of the metallic spring members 28. These spring members are of substantially inverted U-shape, being secured at their bight portions to the base of the body and having the inturned feet 29 at the ends of said members resting upon the horizontally disposed portions of the frame bars. Bolts 30 may be passed through these feet and through the angle iron bars 10 to rigidly and yet detachably secure the body to the chassis. The body, while being firmly held upon the chassis, is spaced a considerable distance above the chassis so as to provide for the proper relative mounting of all parts, and the members 28 yieldingly support the body in proper position.

The main sled runners indicated at 31 are secured to the lower ends of inverted substantially U-shaped strap irons 32, the latter being bolted at their bight portions to the frame bars 10. The rear ends of the sled runners are provided with upstanding bracket plates 33 which receive the spindles of the rear axle, and the forward ends of the runners are curved upwardly and rearwardly as shown. These runners are formed preferably of angle iron of small dimension. The front axle has secured thereto the steering runners 34. These runners comprise the relatively short angle members shown, being connected near their rear ends by the bracket member 35, and being attached at their forward ends as by bolts to the front axle. Strap members 36 connect the front ends of these runners with the bight portion of the bracket 35. It will be observed that the runners of this guiding sled are spaced apart a distance less than the main sled runners. It is obvious from this construction that a runabout automobile type of wheeled vehicle may be readily converted into a coasting sled. The base 25 may be provided with an opening to allow the legs of the occupant to pass downward therethrough and his feet to engage the foot plates 23, for the purpose of resting the feet or steering the vehicle, or suitable steering mechanism may be provided for steering the vehicle as hereinafter described.

Figure 2:
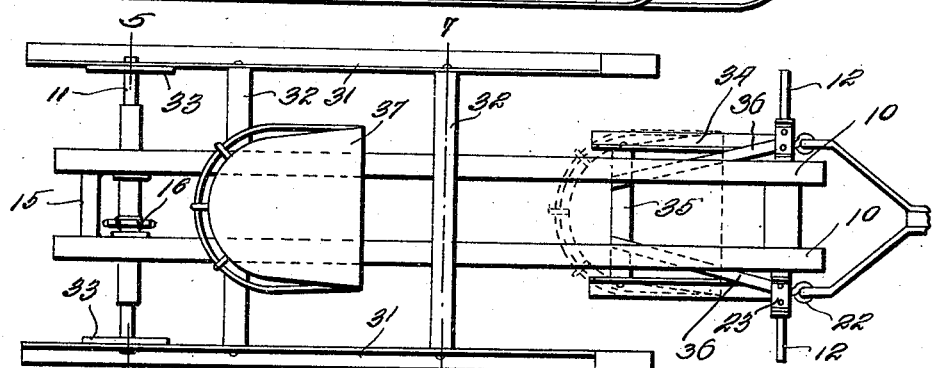
Figure 2 is a top plan view thereof, showing a modification in the form of the sled.
Figure 5:
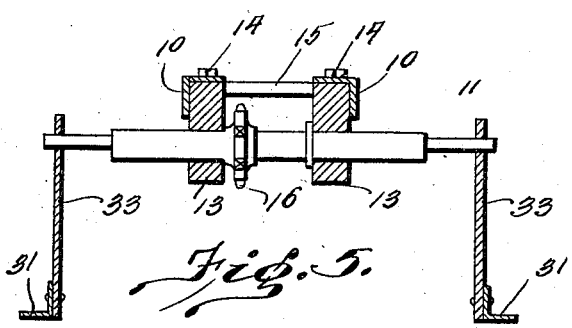
Figure 5 is a transverse section on line 5—5 of Figure 2.
Figure 6:
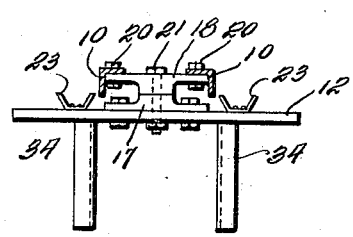
Figure 6 is a detail section showing the front axle construction.

Figure 2 shows the automobile body structure removed and a single seat 37 applied to the frame bars 10. This seat, like the similar seat 37 shown in Figure 3, is an individual seat structure including a seat base having secured to the underside thereof the bight portions of a pair of the metallic spring members 28, the foot portions of which are fastened as previously described to the frame bars 10. This provides a light weight coaster sled which may be easily and conveniently drawn and steered and controlled by the user. In the use of a pair of metallic spring members or brackets for resiliency supporting an individual seat there may be provided a strap member 38 for connecting and reinforcing said brackets. This strap member 38 may be formed integral with the U-shaped brackets 28, or it may be welded thereto or bolted, as desired, and it is obvious that such structure greatly strengthens the seat supports and enables the latter to withstand the strains and pressures to which they will be subjected.

Figure 3 shows another form of the invention wherein the individual seat 37 is mounted in a forward position upon the frame bars 10 and a wagon body 39 is bolted or otherwise detachably secured upon the frame bars in rear of said seat. In this form, as well as in the other forms of the invention it will be understood that a draft tongue or shafts may be employed and properly equipped to enable dogs, goats or ponies to be hitched thereto for the purpose of drawing the vehicle. In the form of the invention shown in Figure 4 a seat board 40 is secured to and is of substantially the same length as the frame bars 10. The spindles of the forward axle in this construction are provided with hand grips 41 to enable the rider to steer the sled while lying in a recumbent position upon the seat board. Should it be desired, this coaster may accommodate a number of persons in sitting position, and it will be understood that the foremost person will steer the same by placing his feet upon the front axle. Figure 9 shows another form of the invention wherein the frame bars and steering sled runners are omitted and only the main runners and the wagon body 39 are used. The U-shaped supporting straps 32 are bolted at their bight portions to the underside of the wagon body 39 and the lower ends of their arms are bolted to the vertical flanges or webs of the angle-metal main runners. This vehicle may be propelled by the occupant pushing with his feet, or drag ropes may be applied to the forward ends of the runners, or it may be used as an ordinary bob sled in coasting.

In some of the forms of the invention, as shown in Figure 1, the vehicle is to be steered by a suitable steering apparatus. For the accomplishment of this purpose, the front axle is provided with a rack or segment 42 engaged by a pinion or gear 43 affixed to the lower or forward end of a steering post 44. The steering post is rotatably supported upon the vehicle frame and provided with a hand wheel or similar device arranged in convenient position for use and by means of which the post may be turned to steer the vehicle in an obvious manner.

From the foregoing it will be apparent that I have provided a vehicle structure capable of a variety of changes in form, all of which changes may be readily made by a child of ordinary intelligence and without the use of special skill or tools, since the parts are of interchangeable type. The changes from one form of vehicle to the other may be quickly made, and the simplicity of the construction of the various removable parts enables the various structures to be completed without danger of confusion or breakage or distortion of any of such parts.

Having thus described my invention, I claim:—

1. In a device of the character described, angle metal frame bars, angle metal runners, rear brackets upon the frame bars, a rear axle supported thereby, a front steering axle carried by the frame bars, brackets at the rear ends of the runners extending upwardly therefrom and engaging the ends of the rear axle, U-shaped straps suspended from the frame bars and secured at spaced intervals to the runners in advance of said brackets, and steering runners carried by the front axle.

2. In a device of the character described, a pair of runners arranged in spaced parallel position, attaching brackets carried by said runners near one end of the latter in lateral alinement with each other, rigid non-flexible body supporting straps connected at their ends to said runners and having their medial portions disposed above the plane of the upper portions of said brackets.

3. In a device of the character described, a frame, a rotatable spindle carried by said frame, a pair of runners, strap members of substantially U-shape arranged in inverted position above said runners and having their ends attached to said runners and their medial portions connected with said frame, and brackets on each runner having openings near their upper ends to receive said spindles.

4. In a device of the character described, a pair of runners made of angle metal and presenting an upwardly extending flange, brackets secured to and projecting upwardly from said flanges near one end of the runners, the said brackets being alined with each other laterally of the runners, and U-shaped brackets arranged in inverted position spanning said runners and secured at their ends to the flanges of said runners.

In testimony whereof I affix my signature.

RUDOLPH A. MACK.